United States Patent [19]

De Angelis et al.

[11] Patent Number: 4,598,371
[45] Date of Patent: Jul. 1, 1986

[54] IGNITION CONTROL DEVICE FOR AN INTERNAL COMBUSTION ENGINE

[75] Inventors: Giancarlo De Angelis; Renato Saglimbeni, both of Bollate; Riccardo Mainardi, Milan, all of Italy

[73] Assignee: Alfa Romeo Auto S.p.A., Naples, Italy

[21] Appl. No.: 504,393

[22] Filed: Jun. 15, 1983

[30] Foreign Application Priority Data

Jun. 28, 1982 [IT] Italy ............... 22082 A/82

[51] Int. Cl.4 ............................................. F02P 5/15
[52] U.S. Cl. ..................... 364/431.04; 364/431.11; 123/417
[58] Field of Search .............. 364/431.03, 431.04, 364/431.05, 431.06, 431.07, 431.11, 569; 123/416, 417, 418, 480, 486

[56] References Cited

U.S. PATENT DOCUMENTS

| | | | |
|---|---|---|---|
| 4,098,243 | 7/1978 | Yoshida et al. | 123/416 |
| 4,298,941 | 11/1981 | Furuhashi | 364/569 |
| 4,347,570 | 8/1982 | Akiyama et al. | 364/431.04 |
| 4,360,874 | 11/1982 | Ohba et al. | 364/431.04 |
| 4,377,996 | 3/1983 | Yamaguchi | 123/416 |
| 4,393,836 | 7/1983 | De Angelis et al. | 123/417 |
| 4,414,946 | 11/1983 | Däumer et al. | 123/417 |
| 4,429,365 | 1/1984 | Luckman et al. | 364/431.04 |

Primary Examiner—Gary Chin
Attorney, Agent, or Firm—Charles E. Brown; Charles A. Brown

[57] ABSTRACT

The invention relates to an ignition control device of the microcomputer type in which a programmed microprocessor calculates the non-conduction time of the coil in order to attain a desired time for which the coil remains at maximum charge, and also calculates the time corresponding to the end of coil charge as a function of the spark advance suitable for the various engine operating conditions; the microprocessor also causes activation of the ignition coil, whereas the deactivation of the coil is controlled by a timer which counts the time corresponding to the end of coil charge on receiving reference pulses.

5 Claims, 2 Drawing Figures

IGNITION CONTROL DEVICE FOR AN INTERNAL COMBUSTION ENGINE

This invention relates to an ignition control device for an internal combustion engine; the device is of the microcomputer type, comprising a programmed microprocessor (CPU), a read-only memory (ROM), a random access memory (RAM), and an input/output unit, which are connected together and to the microprocessor by parallel interconnection lines (bus lines) for the data, for the addresses and for the control signals, the input/output unit also being connected to sensors for sensing preselected engine parameters, and to the ignition actuation means.

BACKGROUND OF THE INVENTION

In order to reduce fuel consumption and limit pollutant emission in the exhaust gas, there is a tendency to feed internal combustion engines with increasingly weaker mixtures, which require the use of very precise and reliable devices for regulating the fuel metering and for controlling the mixture ignition, so as not to penalize engine efficiency, and to obtain the best performance over its entire range of operation.

Those control devices which currently best satisfy these requirements comprise programmed microprocessors, which also have the advantage of considerable versatility in use; with these devices, the microprocessor can control both the quantifying (numerical values) and the timing (control phasing) of the regulated quantities, and any required variation therein can be attained fairly simply by modifying the microprocessor programming.

SUMMARY OF THE INVENTION

During the course of our research it has however been found that microprocessor control devices could be most effectively utilized if only certain timing functions were performed directly by the microprocessor, whereas others were performed by suitable components provided in the input/output unit. With this method, the microprocessor is mainly dedicated to calculation operations and only partly to control operations, and can thus more frequently update the calculated data, and can handle an increasingly greater number of engine functions.

An ignition control device has therefore been conceived in which the microprocessor calculates the pause or non-conduction time of the ignition coil with the aid of a suitable timer, and on the basis of the calculated value it controls the activation of the coil, which initiates coil charging operation; the microprocessor also calculates the spark advance with the air of data tables, as a function of preselected engine parameters, and from this it obtains the time corresponding to the end of coil charge relative to a reference event (hereinafter called the delay time), this calculated delay time being calculated by a further suitable timer which at the end of the count causes the deactivation of the ignition coil, which interrupts the charge and causes the spark to strike at the spark plugs.

The invention provides an ignition control device of the microcomputer type, provided with an input/output unit operationally connected to sensors of preselected engine parameters, to first pulse generator means arranged to provide a pulse signal for each ignition to be effected in the engine, to second pulse generator means arranged to provide a pulse signal for each engine cycle, and to ignition coil actuator means, the input/output unit being characterised by comprising:

first timer means operationally connected to the microprocessor in order to receive the calculated quantity constituted by the delay time to be counted and in order to feed a first interruption signal at the end of the count, and which are operationally connected to the first pulse generator means in such a manner as to be caused to initiate the counting of the delay time by a pulse signal, and which are further operationally connected to the actuator means in order to feed an output signal which causes deactivation of the ignition coil at the end of the delay time count, second timer means operationally connected to the microprocessor to receive the calculated quantity constituted by the pause time to be counted, in order to be caused to initiate the count after the arrival of the first interruption signal and to feed a second interruption signal at the end of the count, interface means operationally connected to the microprocessor in order to receive the second interruption signal, and operationally connected to the actuator means in order to feed a signal which causes activation of the ignition coil on the arrival of the second interruption signal, and comparator means operationally connected to the ignition coil and to the second timer means in order to cause them to initiate the count of the time for which the coil remains at maximum charge on exceeding the charge energy by a predetermined value, the second timer means being caused by the microprocessor to terminate the count of the time of remaining at maximum charge on arrival of the first interruption signal.

By this method it is therefore possible to control the time for which the coil remains under maximum charge conditions, by adjusting it so that it assumes the value strictly necessary to attain maximum accumulable energy, while preventing the coil remaining energized under maximum charge conditions for a time exceeding that which is strictly necessary.

BRIEF DESCRIPTION OF THE DRAWINGS

The constructional and operational characteristics of the invention will be more apparent from the accompanying drawings, which show a preferred embodiment of the invention by way of non-limiting example and in which.

DESCRIPTION OF THE PREFERRED EMBODIMENT

Figure 1:
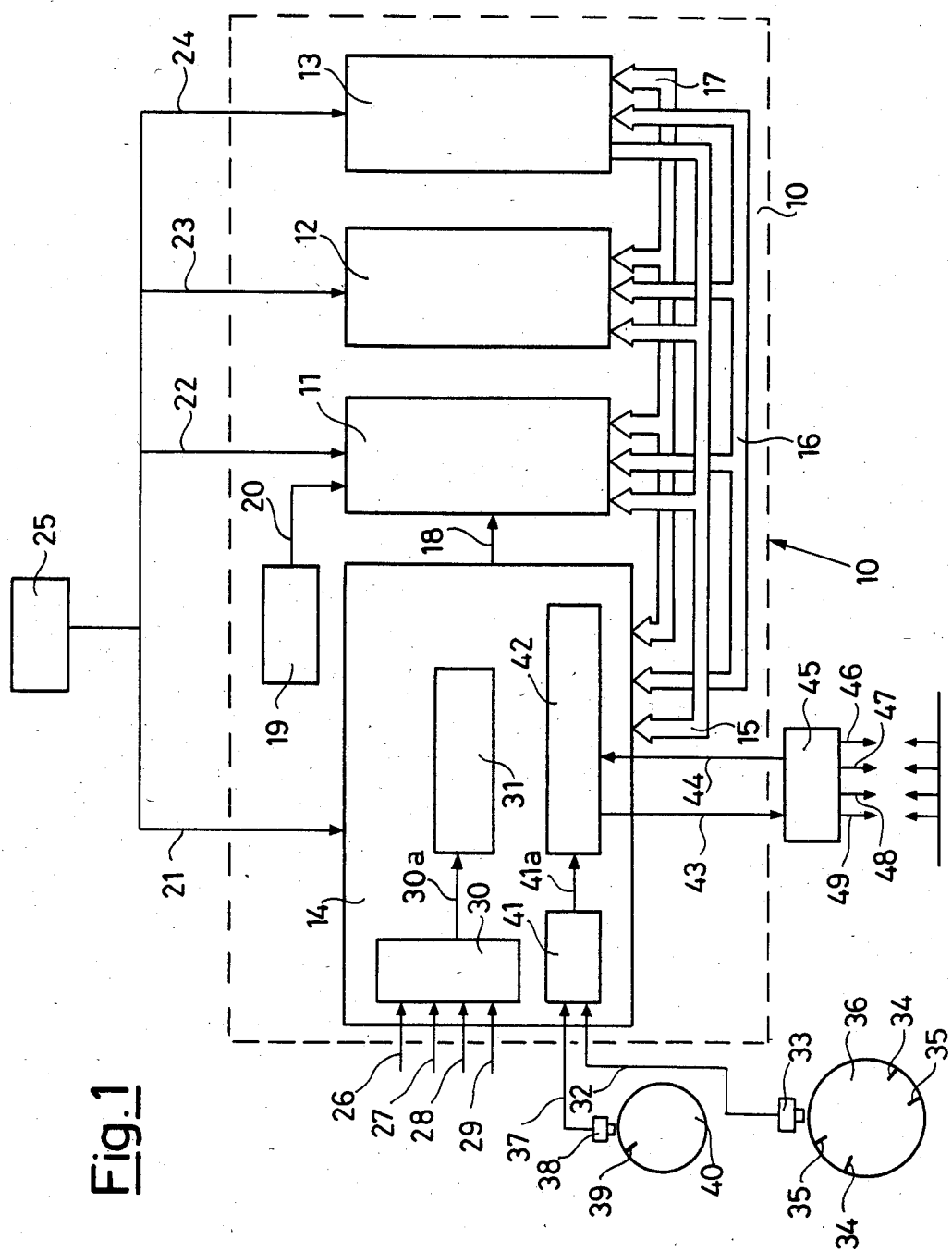
FIG. 1 is a block diagram which shows an ignition control device of the microcomputer type.

In FIG. 1, the reference numeral 10 indicates overall a microcomputer constituted by a microprocessor (CPU) 11, a random access working memory (RAM) 12, a permanent read-only memory (ROM) 13 which contains the data tables and operation programs of the microprocessor, and an input/output unit 14.

The microprocessor, memories and input/output unit are connected together by a parallel interconnection line (bus line) 15 for the data, by a parallel interconnection line (bus line) 16 for the addresses, and by a parallel interconnection line (bus line) 17 for the internal control signals.

The reference numeral 18 indicates a connection line between the input/output unit 14 and the microprocessor 11 for conveying the interruption signals. These signals interrupt the calculation being undergone in the microprocessor when determined events occur.

The reference numeral 19 indicates a clock pulse generator able to provide the microprocessor 11 with a train of pulses of determined frequency by way of the line 20.

The reference numerals 21, 22, 23, 24 indicate the lines which connect the units 14, 11, 12, 13 to a power supply unit of stabilised voltage, represented by the block 25.

The input/output unit 14 receives a signal emitted by a sensor (not shown) which senses the angular position of the engine throttle valve through the line 26, a signal emitted by a sensor (not shown) which senses the engine cooling water temperature through the line 27, a signal emitted by a sensor (not shown) which senses the engine feed air temperature through the line 28, and finally a signal emitted by an engine detonation sensor (not shown) through the line 29.

These signals reach a multiplexer indicated by 30, which feeds them, as required by the microprocessor, through the internal line 30a to an analog/digital conversion circuit (converter) 31.

The input/output unit 14 also receives through the line 32 a pulse signal generated by the magnetic sensor 33 on passage of the notches 34 and 35 of the wheel 36, which is connected to the drive shaft (not shown). In the case under examination, the ignition control device is provided for a four cylinder four-stroke engine, in which two ignitions have to be effected for each revolution of the engine. Consequently, the wheel 36, which can be the engine flywheel, is provided with two notches 34 disposed 180° apart and suitably offset relative to the cylinder top dead center. When these two notches pass in front of the sensor 33, they generate two reference pulses for each engine revolution. Each of the reference pulses causes counting of the delay time corresponding to the spark advance calculated by the microprocessor, as described hereinafter, for the engine cylinder which is in the compression stage, on the basis of the order of explosion.

The auxiliary notches 35, which are also disposed 180° apart in the wheel 36 and suitably offset from the top dead centre, generate two reference pulses for counting the delay time during engine start, as is described in detail hereinafter.

The unit 14 receives through the line 37 a second pulse signal emitted by the magnetic sensor 38 on passage of the notch 39 of the wheel 40, which is connected to a shaft rotating at one half the speed of the engine.

The notch 39 is also suitably offset from the cylinder top dead center, and the pulse signal which it generates at every two revolutions of the engine serves for counting the engine cycles, as the engine is of the four-stroke type.

The pulse signals carried by the lines 32 and 37 enter an adaptation circuit 41 where they are squared and fed through the internal line 41a to an output control circuit 42, which provides for timing the ignition on the basis of the advance calculated at any given time by the microprocessor.

Figure 2:
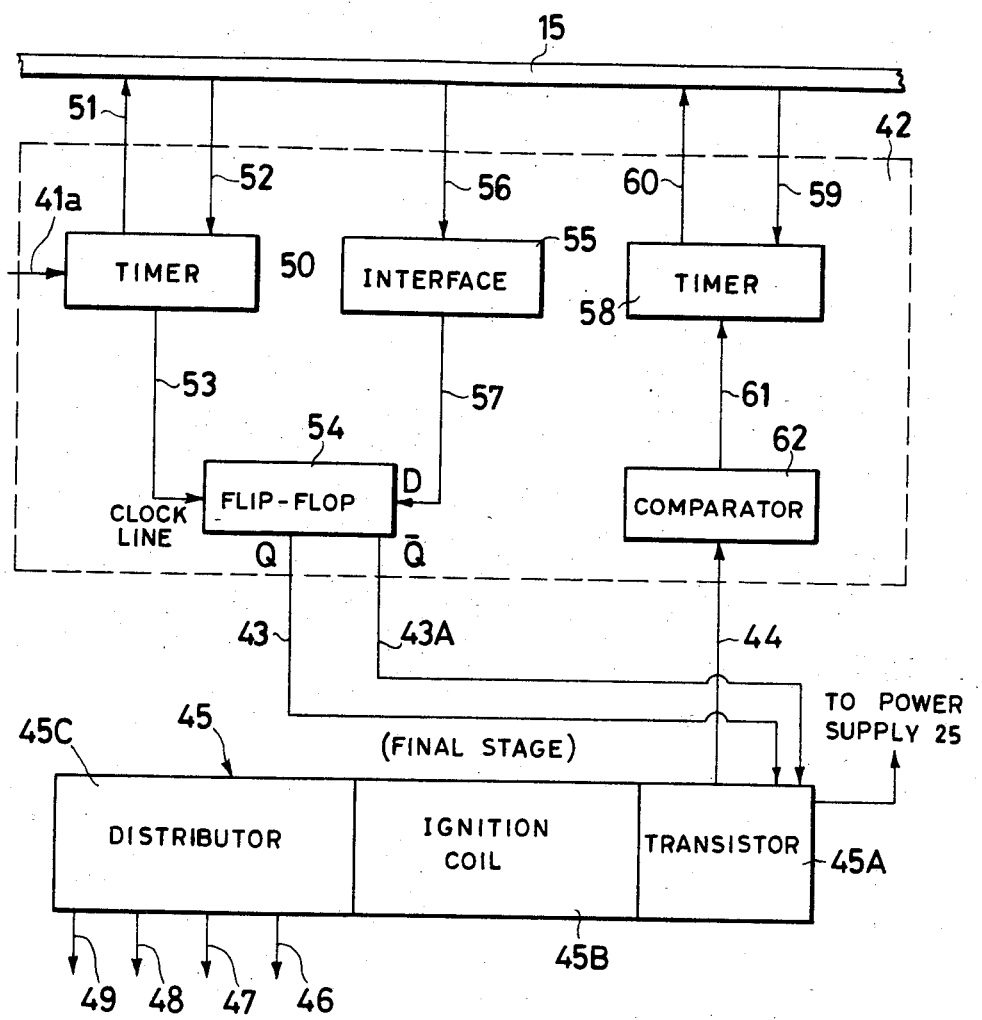
FIG. 2 is a block diagram which shows an input/output unit according to the invention.

The control circuit 42, which is shown in detail in FIG. 2, is connected by the lines 43, 43A and 44 to the final stage 45 of the engine ignition system. This final stage comprises a power transistor 45A connected to the electrical power supply unit, the ignition coil 45B, to which the transistor 45A is also connected, and a distributor 45C for distributing the high voltage to the spark plugs, indicated in FIG. 1 by 46, 47, 48, 49.

FIG. 2 shows in detail the output control circuit 42 constructed in accordance with the invention.

The reference numeral 50 indicates a decremental timer connected by the internal lines 51 and 52 to the parallel data interconnection line (bus bar) 15, and by the clock line 53 to the flip-flop 54. The reference numeral 55 indicates an interface circuit connected by the internal line 56 to the line 15 and by the internal line 57 to the flip-flop 54, which is itself connected by the "Q" output lines 43, 43A to the final stage 45. The interface circuit 55 feeds to the flip-flop 54 the signal ("D" input) emitted by the microprocessor.

The reference numeral 58 indicates a second decremental timer connected by the internal lines 59 and 60 to the lines 15 and by the internal line 61 to a current threshold level comparator indicated by 62, which is itself connected by the line 44 to a voltage divider in series with the primary winding of the ignition coil.

The described device operates in the following manner.

The microprocessor 11 executes the calculation and uses the data tables contained in the permanent memory 13 in order to process the signals which indicate the engine operating conditions, and which enter the multiplexer 30 in order to process the pulse signals originating from the magnetic sensor 33, to obtain the engine rotational speed (for example by the method described in U.S. Pat. No. 4,323,976 granted on Apr. 6, 1982) and to calculate as a function of these signals the most suitable spark advance angle $\phi a$ with respect to the piston top dead center. Proceeding with its calculation programme, the microprocessor then transforms the calculated advance angle $\phi a$ into a delay time $t_r$ relative to a reference signal, which in this particular case is the pulse generated by the notch 34 preceding the top dead center. In order to effect this transformation, the microprocessor subtracts the calculated advance angle $\phi a$ from a constant K, which in this particular case is the 60° angle between the notch 34 and the top dead center, to thus obtain a delay angle $$\phi r = 60° - \phi a$$

with respect to the reference point constituted by the notch 34. The delay angle obtained in this manner is divided by the engine angle of rotation between a pair of notches 35, which in this particular case is 180°, i.e. $\phi r/180°$.

The microprocessor multiplies the non-dimensional coefficient obtained in this manner by a number of clock pulses (of constant frequency) equal to the algebraic sum of the pulses $N_1$ totalised on a suitable counter during the time interval between the passage of two successive notches 35 in front of the sensor 33, and the pulses representing the difference between the pulses $N_1$ totalized during said interval and the pulses $N_0$ totalized during the immediately preceding interval between two successive notches 34:

$$t_r = \phi r/180° \; (N_1 + (N_1 - N_0))$$

The microprocessor thus calculates the delay time, and is able to introduce a correction into the calculated spark advance angle in the case of rapid engine acceleration, by means of said algebraic sum $N_1+(N_1-N_0)$, because the time interval between two successive notches 35, corresponding to 180° of the engine, is corrected by the difference with respect to the interval corresponding to the preceding 180° of the engine.

The microprocessor updates the delay time calculation twice for each engine revolution on receiving the pulses generated by the notches 35, and after performing the calculation it feeds the value obtained in this manner to the timer 50, to determine the end of charge of the ignition coil.

The arrival of the next pulse generated by the notch 34, corresponding to the cylinder which is in its compression stage, directly causes the timer 50 to decrement by the value with which it was fed by the microprocessor; when the timer 50 reaches zero it emits an output signal through the line 53 and a first interruption signal through the line 51.

The output signal from the timer 50 causes the flip-flop 54 to move into its first stable state, and through "Q" output line 43 switches off the power transistor of the final stage 45 to interrupt the charge of the engine ignition coil, which thus strikes the spark at the spark plug of that cylinder in the compression stage.

On the arrival of said first interruption signal, the microprocessor calculates the pause time of the ignition coil, ie the time during which said coil does not conduct, and feeds this time to the timer 58 through the line 59 in order to cause it to decrement. The microprocessor calculates the pause time $t_s$ by algebraically adding to the pause time $t_{so}$ of the preceding ignition stage the difference between the effective time $t_{MC}$ for which the coil remains at maximum charge during said preceding ignition stage, and a desired time for remaining at maximum charge $t_{MC}^*$:

$$t_s = t_{so} + (t_{MC} - t_{MC}^*).$$

If the difference in the effective time and the desired time for which the coil remains at full charge exceeds a minimum difference, the microprocessor increments the calculated pause time by stages, by adding at each calculation cycle a determined fraction of the difference, until the desired time for which the coil remains at full charge is attained.

It should be noted that the desired time for which the coil remains at maximum charge is established on the basis of the ignition coil characteristics.

When the timer 58 has been decremented by the pause time, with which it has been fed, it feeds the microprocessor through the line 60 with a second interruption signal, which is used by the microprocessor to feed a control signal to the flip-flop 54 through the line 56, and to the interface circuit 55.

This signal from the microprocessor causes the flip-flop 54 to move to its second stable state, and through "Q" output line 43A cause the power 45A of the final stage 45 to conduct, in order to initiate the charging of the ignition coil.

When the charge current and thus the charge energy of the ignition coil exceeds a predetermined value, the threshold level comparator 62 senses that the maximum value has been exceeded, and feeds a signal to the timer 58, which begins to count the time for which the coil remains under maximum charge conditions. This counting by the timer 58 is halted by the microprocessor when it receives from the timer 50 the first interruption signal corresponding to the end of coil charge, and to the striking of the spark at a spark plug.

The microprocessor reads the time for which the coil remains at maximum charge, and uses it together with the previously read pause time in order to update the calculation of said pause time, by using the algorithm heretofore described.

The notches 35 of the wheel 36 serve for counting the delay time in the case of very small spark advances. In this particular case, the notches 35 are disposed 13° before the top dead centre, and thus serve for counting spark advances of less than 13°.

By this means it is possible to avoid counting very long delay times which would occur in the case of small spark advances, and which would lead to considerable calculation errors because of variations in the angular speed of the engine during the time intervals between the notches 35.

After calculating the spark advance, the microprocessor checks whether it is of a value greater or less than 13°, and if it exceeds 13° it calculates the delay time and controls the ignition in the manner heretofore described. If it is less than 13°, the microprocessor sets a conventional register (not shown) at a constant or dissent figure (flag) in order to nullify the counting control for the timer 50, constituted by the pulse generated by the notch 34. The conventional register is a one figure register commonly known to those skilled in the art as a "flag" and having the peculiarity of assuming a high logic level (corresponding to "yes" or consent), or a low logic level (corresponding to "no" or dissent). In contrast, the microprocessor causes the timer 50 to commence counting of the delay time when it receives the pulse generated by the notch 35. By way of example, the symbols of the components used for constructing the device according to the invention are as follows:

Microprocessor 11:Z 80
ROM memory 13:M 36000-5 B1 AS
RAM memory 12:2114
Timer 50 and 58: CTC Z 80
Comparator 62:LM 2902
Interface circuit 55: PIO Z 80

We claim:
1. An ignition control device for a plural cylinder internal combustion engine having an ignition system incuding an ignition coil, of the microcomputer type comprising a programmed microprocessor (CPU), a read-only memory (ROM) containing calculation programs for said microprocessor and data tables necessary for calculations, a random access memory (RAM), and an input/output unit which are connected together and to said microprocessor by parallel interconnection lines (bus lines) for data, for addresses and for control signals, said input/output unit being operationally connected to sensors which sense preselected engine parameters, to first pulse generator means arranged to provide a pulse signal for each ignition to be effected in the engine, to second pulse generator means arranged to provide a pulse signal for each engine cycle, and to ignition coil actuator means, said input/output unit comprising:

first timer means operationally connected to said microprocessor for receiving from said microprocessor a calculated quantity constituted by a delay time to be counted and said first timer means feeding a first interruption signal to said microprocessor at the end of the count of said first timer means, and said first timer means operationally connected to said first pulse generator means in such a manner as to be caused to initiate the counting of said delay time by said pulse signal, and said first timer means are further operationally connected to said actuator means for feeding an output signal which causes deactivation of said ignition coil at the end of the delay time count, second timer means operationally connected to said microprocessor for receiving from said microprocessor the calculated quantity constituted by the pause time to be counted, in order to be caused to initiate the count of said second timer means after the arrival of said first interruption signal, said second timer means feeding a second interruption signal to said microprocessor at the end of the count of said second timer means, interface means operationally connected to said microprocessor for receiving said second interruption signal and operationally connected to said actuator means for feeding a signal which causes said ignition coil to conduct on the arrival of said second interruption signal, and comparator means operationally connected to said ignition coil and to said second timer means for causing said second timer means to initiate the count of the time for which said ignition coil remains at maximum charge on exceeding the charge energy by a predetermined value, said second timer means being caused by the microprocessor to terminate the count of said time of said ignition coil remaining at maximum charge on arrival of said first interruption signal.

2. A device as claimed in claim 1, wherein said comparator means is a voltage threshold level comparator.

3. A device as claimed in claim 1, wherein said first pulse generator means include a wheel which rotates at the same speed as the engine and is provided with two reference marks for each ignition which is to be effected in the engine, one reference mark being more advanced and the other less advanced than the top dead center of each cylinder.

4. A device as claimed in claim 1, wherein said microprocessor is programmed to calculate the delay time, corresponding to the end of coil charge, as a function of the spark advance angle suitable for the engine operating conditions, and as a function of the constant frequency pulses totalized during preselected time intervals.

5. A device as claimed in claim 1, wherein the microprocessor is programmed to calculate the pause or nonconducting time of said ignition coil as a function of the pause time of the preceding ignition stage and of the difference between the time for which said ignition coil remains at maximum charge during the preceding ignition stage and a determined desired time of said ignition coil remaining at maximum charge.

* * * * *